US010648806B2

(12) United States Patent
Hesh et al.

(10) Patent No.: US 10,648,806 B2
(45) Date of Patent: May 12, 2020

(54) MICROCONTROLLER CONTROLLED ALTIMETER

(71) Applicant: The United States of America, as represented by the Administrator of the National Aeronautics and Space Administration, Washington, DC (US)

(72) Inventors: Scott V. Hesh, Greenbackville, VA (US); Taylor A. Green, Pocomoke City, MD (US); Joshua T. Yacobucci, Greenbackville, VA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 560 days.

(21) Appl. No.: 15/623,889

(22) Filed: Jun. 15, 2017

(65) Prior Publication Data

US 2018/0364039 A1    Dec. 20, 2018

(51) Int. Cl.
G01C 5/06 (2006.01)
G05B 11/01 (2006.01)
(52) U.S. Cl.
CPC .............. *G01C 5/06* (2013.01); *G05B 11/01* (2013.01)
(58) Field of Classification Search
CPC ................................. G01C 5/06; G05B 11/01
See application file for complete search history.

(56) References Cited

U.S. PATENT DOCUMENTS 3,858,172 A * 12/1974 Henry .................... G01C 5/06
340/970

OTHER PUBLICATIONS

Wikipedia contributors. "Electrical contacts." Wikipedia, The Free Encyclopedia. Wikipedia, The Free Encyclopedia, Dec. 23, 2019. Web. Feb. 18, 2020. (Year: 2020).*

* cited by examiner

*Primary Examiner* — Daniel J Cavallari
(74) *Attorney, Agent, or Firm* — Christopher O. Edwards; Bryan A. Geurts (57) ABSTRACT

A microcontroller controlled altimeter includes a microcontroller, a digital altitude pressure sensor with a pressure indicating output coupled to the microprocessor, and at least one Form A solid state relay coupled to the microcontroller, where the microcontroller is configured to provide control signals to the at least one Form A solid state relay to provide an open circuit between normally open and common terminals of the at least one Form A solid state relay if the digital altitude pressure sensor output is less than, or equal to, a setpoint for the at least one Form A relay, and provide continuity between the normally open and common terminals of the at least one Form A solid state relay if the digital altitude pressure sensor output is greater than the setpoint for the at least one Form A relay.

16 Claims, 5 Drawing Sheets

MICROCONTROLLER CONTROLLED ALTIMETER

ORIGIN OF THE INVENTION

Invention by Government Employee(s) Only

The invention described herein was made by one or more employees of the United States Government, and may be manufactured and used by or for the Government for governmental purposes without the payment of any royalties thereon or therefor.

BACKGROUND

The disclosed embodiments generally relate to altimeter switches, and in particular, to improvements to traditional mechanically based altimeter switch designs.

An altimeter switch generally measures altitude and provides one or more switch channels with normally open and normally closed switches that change state when a particular altitude is reached. Traditional altitude switch designs for harsh environments are generally mechanical in nature and operate by means of an inflatable bladder or bellows that mechanically depresses a push-button switch as the bladder inflates with altitude. The altitude setpoint is set by mechanically adjusting the distance between the push button switch and the bellows. Variations in the mechanical actions of the push button switch and the bellows results in a loss of accuracy of the setpoint on the order of several thousand feet, forcing engineers to design interfacing systems with an extremely high error tolerance. These types of bladder and mechanical push button switch systems are not only inaccurate, but are relatively large and difficult to manufacture. The traditional systems generally require hand wiring and soldering each sensor assembly resulting in long build times and susceptibility to workmanship and vibration issues. If the altitude setpoint for an application changes, a new push button switch and bellows combination must be assembled and installed in place of the previous combination. Furthermore, these systems are prone to failure under operating conditions in the field, when reliability is most important, for example, when using the altimeter switch to control pyrotechnic firings to separate rocket stages or to release parachutes.

It would be advantageous to provide a more accurate altitude switch that is more reliable, provides similar switch channel density, has easier to reconfigure setpoints and is easier to assemble.

SUMMARY

The disclosed embodiments are directed to a microcontroller controlled altimeter including a microcontroller, a digital altitude pressure sensor with a pressure indicating output coupled to the microprocessor, and at least one Form A solid state relay coupled to the microcontroller, where the microcontroller is configured to provide control signals to the at least one Form A solid state relay to provide an open circuit between normally open and common terminals of the at least one Form A solid state relay if the digital altitude pressure sensor output is less than, or equal to, a setpoint for the at least one Form A relay, and provide continuity between the normally open and common terminals of the at least one Form A solid state relay if the digital altitude pressure sensor output is greater than the setpoint for the at least one Form A relay.

The at least one Form A solid state relay may include an isolating driver coupled to the control signals to the at least one Form A solid state relay, driving a pair of Field Effect Transistors (FETs) connected back to back.

The microcontroller controlled altimeter may also include at least one Form C solid state relay coupled to the microcontroller, where the microcontroller is configured to provide control signals to the at least one Form C solid state relay to provide an open circuit between normally open and common terminals of the at least one Form C solid state relay if the digital altitude pressure sensor output is less than, or equal to, a setpoint for the at least one Form C relay, provide continuity between the normally open and common terminals of the at least one Form C solid state relay if the digital altitude pressure sensor output is greater than the setpoint for the at least one Form C relay, provide continuity between normally closed and common terminals of the at least one Form C solid state relay if the digital altitude pressure sensor output is less than, or equal to, the setpoint for the at least one Form C relay, and provide an open circuit between the normally closed and common terminals of the at least one Form C solid state relay if the digital altitude pressure sensor output is greater than the setpoint for the at least one Form C relay.

The at least one Form C solid state relay may include a pair of isolating drivers coupled to the control signals to the at least one Form C solid state relay, each driving a pair of FETs connected back to back, wherein the pairs of FETs are connected in series.

The microcontroller controlled altimeter may also include a hardware lockout circuit through which the control signals from the microcontroller to the at least one Form A solid state relay and from the microcontroller to the at least one Form C solid state relay are coupled, and a breakwire conductor that when grounded, enables the hardware lockout circuit and disconnects the control signals from the microcontroller to the at least one Form A solid state relay and to the at least one Form C solid state relay.

The microcontroller controlled altimeter may also include a communications port, where the microcontroller is further configured to collect telemetry data comprising one or more of a telemetry packet number, a state of the breakwire conductor, the microcontroller control signals to each of the at least one Form A solid state relay and to the at least one Form C solid state relay, an output of each of the at least one Form A solid state relay and the at least one Form C solid state relay, the setpoints for the at least one Form A and the at least one Form C relays in feet, the setpoints for the at least one Form A and the at least one Form C relays converted to pressure, an output of the digital altitude pressure sensor; a current temperature, and a firmware version and checksum of the microcontroller, and communicate the telemetry data through the telecommunications port.

The microcontroller controlled altimeter may further include a system programming port configured to load the at least one setpoint into a memory of the microcontroller.

The system programming port may be configured to load systems programs into the memory of the microcontroller.

The disclosed embodiments are also directed to a method of operating a microcontroller controlled altimeter, where the microcontroller controlled altimeter includes a microprocessor, a digital altitude pressure sensor with a pressure indicating output coupled to the microprocessor, and at least one Form A solid state relay coupled to the microprocessor. The method includes operating the microcontroller to provide control signals to the at least one Form A solid state relay to provide an open circuit between normally open and common terminals of the at least one Form A solid state relay if the digital altitude pressure sensor output is less than, or equal to, a setpoint for the at least one Form A relay, and provide continuity between the normally open and common terminals of the at least one Form A solid state relay if the digital altitude pressure sensor output is greater than the setpoint for the at least one Form A relay.

The method of operating the microcontroller controlled altimeter may include constructing the at least one Form A solid state relay using an isolating driver coupled to the control signals to the at least one Form A solid state relay, driving a pair of FETs connected back to back.

The microcontroller controlled altimeter may also include at least one Form C solid state relay coupled to the microcontroller, and the method may include operating the microcontroller to provide an open circuit between normally open and common terminals of the at least one Form C solid state relay if the digital altitude pressure sensor output is less than, or equal to, a setpoint for the at least one Form C relay, provide continuity between the normally open and common terminals of the at least one Form C solid state relay if the digital altitude pressure sensor output is greater than the setpoint for the at least one Form C relay, provide continuity between normally closed and common terminals of the t least one Form C solid state relay if the digital altitude pressure sensor output is less than, or equal to, the setpoint for the at least one Form C relay, and provide an open circuit between the normally closed and common terminals of the at least one Form C solid state relay if the digital altitude pressure sensor output is greater than the setpoint for the at least one Form C relay.

The method of operating a microcontroller controlled altimeter may include constructing the at least one Form C solid state relay using a pair of isolating drivers coupled to the control signals to the at least one Form C solid state relay, each isolating driver driving a pair of FETs connected back to back, where the pairs of FETs are connected in series.

The method of operating a microcontroller controlled altimeter may include using a hardware lockout circuit to disconnect the control signals from the microcontroller to the at least one Form A solid state relay and to the at least one Form C solid state relay, when a breakwire conductor of the hardware lockout circuit is grounded.

The method of operating a microcontroller controlled altimeter may include collecting telemetry data comprising one or more of a telemetry packet number, a state of the breakwire conductor, the microcontroller control signals to each of the at least one Form A solid state relay and to the at least one Form C solid state relay, an output of each of the at least one Form A solid state relay and the at least one Form C solid state relay, the setpoints for the at least one Form A and the at least one Form C relays in feet, the setpoints for the at least one Form A and the at least one Form C relays converted to pressure, an output of the digital altitude pressure sensor; a current temperature, and a firmware version and checksum of the microcontroller, and communicating the telemetry data through a telecommunications port of the microcontroller controlled altimeter.

The method of operating a microcontroller controlled altimeter may include loading the at least one setpoint into a memory of the microcontroller using a system programming port.

The method of operating a microcontroller controlled altimeter may further include using the system programming port to load systems programs into the memory of the microcontroller.

BRIEF DESCRIPTION OF THE DRAWINGS

The foregoing aspects and other features of the embodiments are explained in the following description, taken in connection with the accompanying drawings, wherein.

DETAILED DESCRIPTION

Although the disclosed embodiments will be described with reference to the embodiments shown in the drawings and described below, it should be understood that these could be embodied in many alternate forms. In addition, any suitable size, shape or type of elements or materials could be used.

The disclosed embodiments overcome the limitations above and other limitations by combining a digital pressure sensor, a microprocessor, and solid state relays to provide a robust and cost effective system with improved accuracy, repeatability, and reliability.

Figure 1:
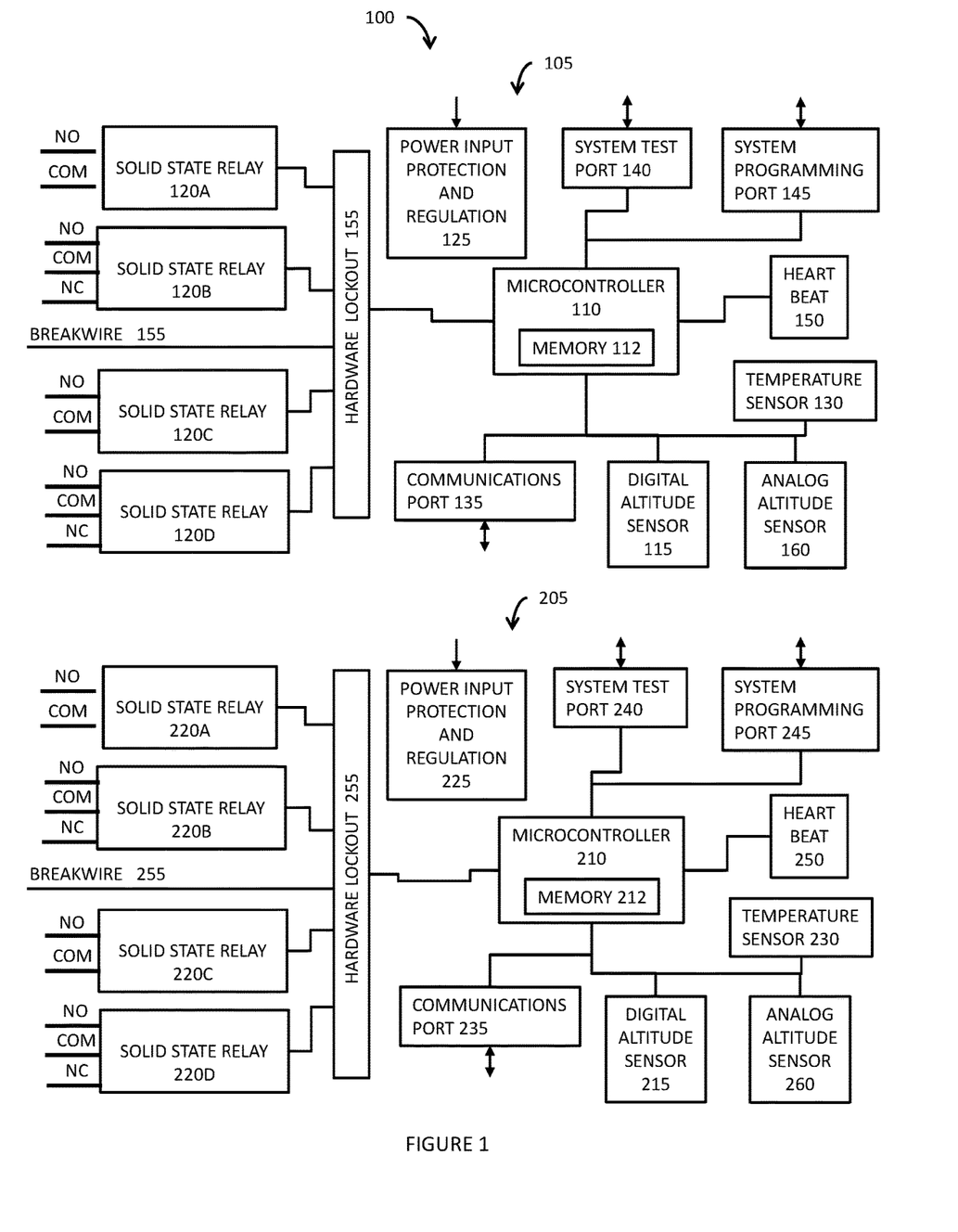
FIG. 1 illustrates an example of a microcontroller controlled altimeter according to the disclosed embodiments.

FIG. 1 illustrates an example of a microcontroller controlled altimeter 100 according to the disclosed embodiments. The altimeter 100 may include a first altimeter system 105 having a microcontroller 110 with a memory 112, a digital altitude pressure sensor 115; and one or more solid state switches, implemented in this embodiment as 4 solid state relays 120A, 120B, 120C, 120D. The first altimeter system 105 may also include power input protection and regulation circuitry 125, a temperature sensor 130, a communications port 135, a systems test port 140, a system programming port 145, and a heartbeat indicator 150. The first altimeter system 105 may optionally include hardware lockout circuitry 155 for preventing the operation of the solid state relays 120A, 120B, 120C, 120D. The first altimeter system 105 may also include an analog altitude pressure sensor 160.

The microcontroller controlled altimeter 100 may include a redundant second system 205 including a microcontroller 210 with a memory 212, a digital altitude pressure sensor 215; and one or more solid state switches, implemented as 4 solid state relays 220A, 220B, 220C, 220D. The redundant second altimeter system 205 may also include power input protection and regulation circuitry 225, a temperature sensor 230, a communications port 235, a systems test port 240, a setpoint programming port 245, and a heartbeat indicator 250. Similar to the first altimeter system 105, the redundant second altimeter system 205 may optionally include hardware lockout circuitry 255 for preventing the operation of the solid state relays 220A, 220B, 220C, 220D. The redundant second altimeter system 205 may also include an analog altitude pressure sensor 260. Unless described otherwise, the redundant second system 205 has the same components and operates the same as the first altimeter system 105. For purposes of the disclosed embodiments, it should be understood that the description and the operation of the first altimeter system 105, and the components of the first altimeter system 105, are applicable to the second altimeter system 205, except where noted.

The microcontroller 110 may be a low power, 8 bit RISC-based microcontroller with self-programming flash memory, Random Access Memory (RAM), and Electrically Erasable Programmable Memory (EEPROM). The memory 112 may store computer readable program code for carrying out and executing the processes described herein. The microcontroller 110 may also include a Universal Asynchronous Receiver Transmitter (UART) interface connected to the communications port 135, a Joint Test Action Group (JTAG) interface connected to the system test port 140, and a Universal Serial Bus (USB) interface connected to the system programming port 145.

The digital altitude pressure sensor 115 may be a temperature compensated and calibrated, on-chip signal conditioned, high temperature accuracy, integrated, silicon pressure sensor for measuring absolute pressure by comparison to a reference in-chip vacuum. The digital altitude pressure sensor may include an onboard, ultra-low power, 24 bit ADC with internal factory calibrated coefficients, and may provide a precise digital 24 bit pressure value over a range of approximately 0 to 90,000 feet above sea level. A communication port of the digital altitude pressure sensor 115 may be connected to a port of the microcontroller 110, which in some embodiments may be an Inter-Integrated Circuit (I$^2$C) bus. The digital altitude pressure sensor 115 may respond to commands from the microcontroller including commands to reset, output coefficients, and provide the output of the ADC.

The one or more solid state relays 120A, 120B, 120C, 120D may be implemented as normally open, or as a combination of normally open and normally closed switches. Typical applications may include using the solid state relays 120A, 120B, 120C, 120D to fire pyrotechnics or to charge batteries.

Figure 2:
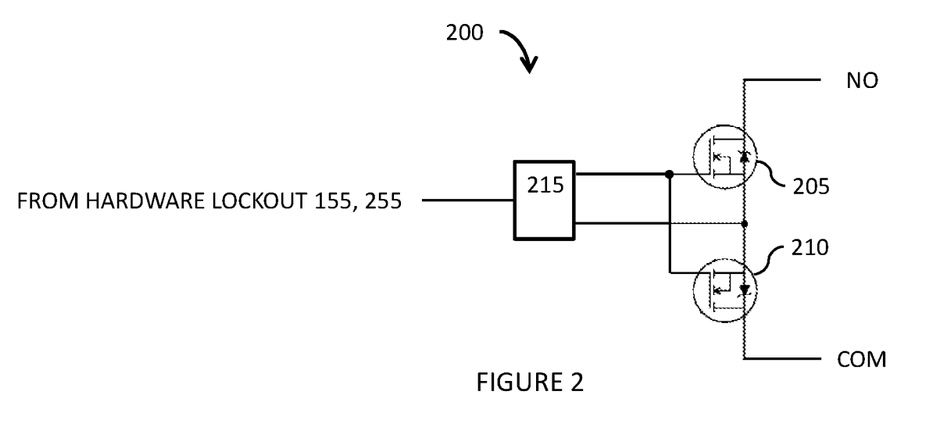
FIG. 2 shows a normally open solid state switch implementation according to the disclosed embodiments.

FIG. 2 shows an exemplary normally open configuration 200 that may be used to implement switches 120A, 120C, 220A, 220C. This configuration provides a FORM-A Solid State Relay. The exemplary normally open configuration 200 may include high power FETs 205, 210 connected back to back in order to more effectively prevent current flow when they are non-conductive. The FETs 205, 210 may be driven from signals from the hardware lockout circuitry 155, 255 through an isolating driver 215, and may be specifically selected for low on resistance in order to minimize power and heat dissipation, allowing for increased current carrying capability and smaller size components. The FETs 205, 210 are generally arranged to provide a normally open terminal NO and a common terminal COM.

Figure 3:
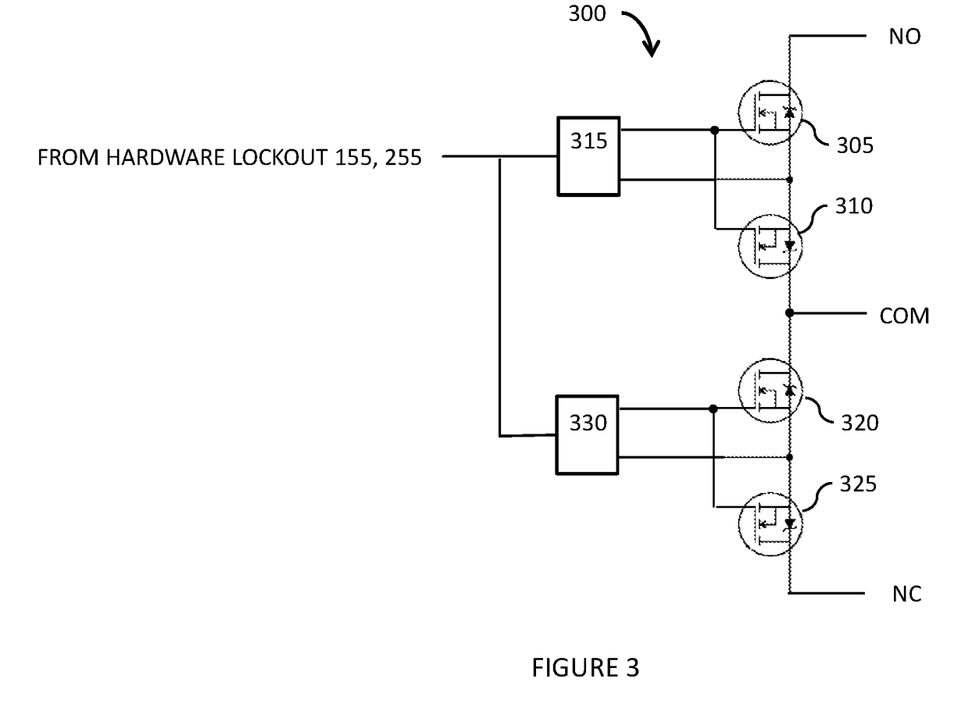
FIG. 3 illustrates a normally closed solid state switch implementation according to the disclosed embodiments.

FIG. 3 shows an exemplary combination normally open, normally closed configuration 300, providing a FORM-C Solid State Relay. This configuration may be used to implement switches 120B, 120D, 220B, 220D. The exemplary normally open, normally closed configuration 300 may include high power FETs 305, 310 connected back to back and driven by isolating driver 315, and connected in series with high powered FETs 320, 325 connected back to back and driven by isolating driver 330. The FETs 305, 310, 320, 325 may also be specifically selected for low on resistance in order to minimize power and heat dissipation. The FETs 305, 310, 320, 325 may The power input protection and regulation circuitry 125 may accept a DC input and include over voltage, under voltage, and reverse polarity protection, and may further provide a regulated DC output for use throughout the microcontroller controlled altimeter 100. The power input protection and regulation circuitry 125 may utilize back to back N-channel MOSFETs (not shown) for interrupting the DC input in the event that the DC input exceeds an over voltage threshold, fails to meet an under voltage threshold, or is connected with reverse polarity. Exemplary over voltage and under voltage thresholds may include approximately 43 volts and 5 volts, respectively. The power input protection and regulation circuitry 125 may include one or more visual indicators, for example, LEDs or other indicators, for indicating one or more of over voltage, under voltage, and reverse polarity fault conditions.

The temperature sensor 130 may have an output coupled to an A/D input of the microcontroller 110 and may provide an analog representation of the temperature of the first altimeter system 105. The temperature sensor 130 may have a linear output of approximately 10 mV/°K, and after calibration, may provide a 1° C. accuracy over a 100° C. temperature range.

The communications port 135 may be configured for exchanging data between the first altimeter system 105 and compatible external devices. For example, the first altimeter system 105 may collect and store data over time during flight, including altitude data, power sensing and regulation data, temperature data, solid state switch state data, and any other data related to the environment or operation of the first altimeter system, and may provide the data to an external device during or after flight. In one embodiment, the communications port may be implemented using a UART function of the microcontroller 110 coupled through an RS 422 port for connection to external devices.

The system test port 140 may be implemented as a JTAG port connected to the microcontroller 110 and may be utilized to load test routines into program memory of the microcontroller 110 for controlling testing operations of the first altimeter system 105.

The system programming port 145 may be configured to provide the ability to load or reload system programs into flash memory of the microcontroller 110 and to load or reload altitude setpoints at which the solid state relays 120A, 120B, 120C, or 120D will close or open, into EEPROM of the microcontroller 110. The system programming port 145 may be implemented as a USB port, and may provide an interface that allows programming or reprogramming system programs and the solid state switch altitude setpoints, as required. In some embodiments, the solid state switch points may be input in units of feet above sea level. For purposes of the present disclosure, the setpoints may be designated setpoints [0-3], indicating altitude setpoints for solid state relays 120A, 120B, 120C, and 120D, respectively.

The heartbeat indicator 150 may include an indicator that the first altimeter system 105 is operational. In at least one embodiment, the heartbeat indicator may include a visual indicator, for example, an LED, powered by a signal from the microcontroller 110. In some embodiments, the signal may have a frequency and duty cycle that constantly illuminates the LED, while in other embodiments, the signal may have a frequency and duty cycle that causes the LED to pulse. The microcontroller 110 may be programmed to provide a specific signal that illuminates the LED in order to provide an indication that the first altimeter system 105 is operational. The microcontroller 110 may also be programmed to provide a specific signal that illuminates the LED in order to provide an indication that the system programming port 145 is active. The microcontroller 110 may further be programmed to provide a specific signal that illuminates the LED to indicate other operations, other operational states, or failure modes of the microcontroller 110, or of the first altimeter system 105.

Figure 4:
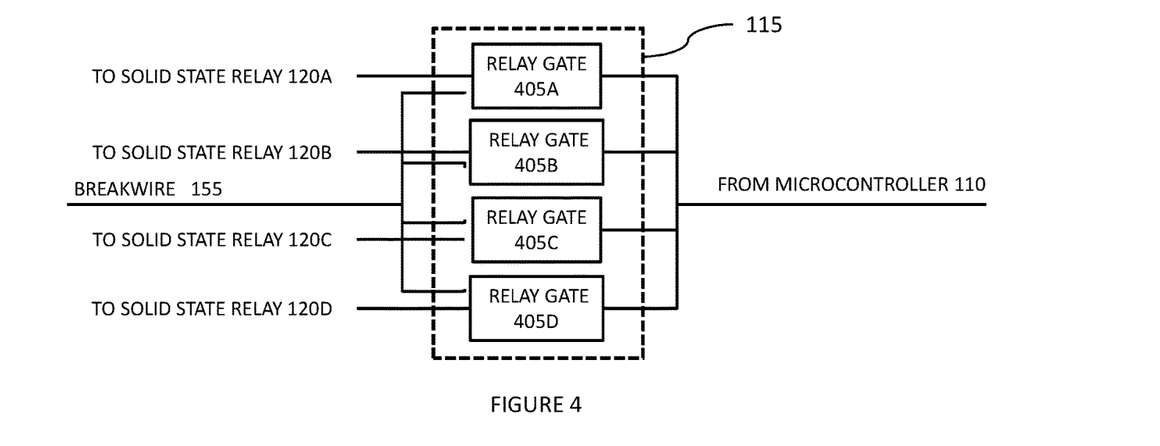
FIG. 4 shows a block diagram of hardware lockout circuitry according to the disclosed embodiments.

The first altimeter system 105 may optionally include hardware lockout circuitry 155 for preventing the operation of the solid state relays 120A, 120B, 120C, 120D. FIG. 4 shows a block diagram of the hardware lockout circuitry 155. A number of relay gates 405A, 405B, 405C, 405D, one for each solid state relay 120A, 1208, 120C, 120D, are provided. Control signals from the microcontroller 110 to the solid state relays 120A, 1208, 120C, 120D are each routed through the respective relay gate 405A, 405B, 405C, 405D to the respective solid state relay 120A, 120B, 120C, 120D. A breakwire conductor 155 providing a breakwire signal enables or disables the control signals from the microcontroller 110. In at least one embodiment, when the breakwire conductor 155 is grounded, the relay gates 405A, 405B, 405C, 405D are disabled and the control signals are isolated from the solid state relays 120A, 120B, 120C, 120D, preventing their operation. When the breakwire conductor 155 is floating or high, the relay gates 405A, 405B, 405C, 405D are enabled and the control signals are connected to the solid state relays 120A, 120B, 120C, 120D allowing their operation. According to one or more exemplary embodiments, when the microcontroller controlled altimeter 100 is connected to ground support equipment, the ground support equipment may connect the breakwire conductor 155 to ground, preventing the operation of the solid state relays 120A, 120B, 120C, 120D. This provides a significant safety feature because, in the event of a failure of the microcontroller 110, signals from the microcontroller are disabled and inadvertent solid state relay operations are prevented.

Figure 5A:
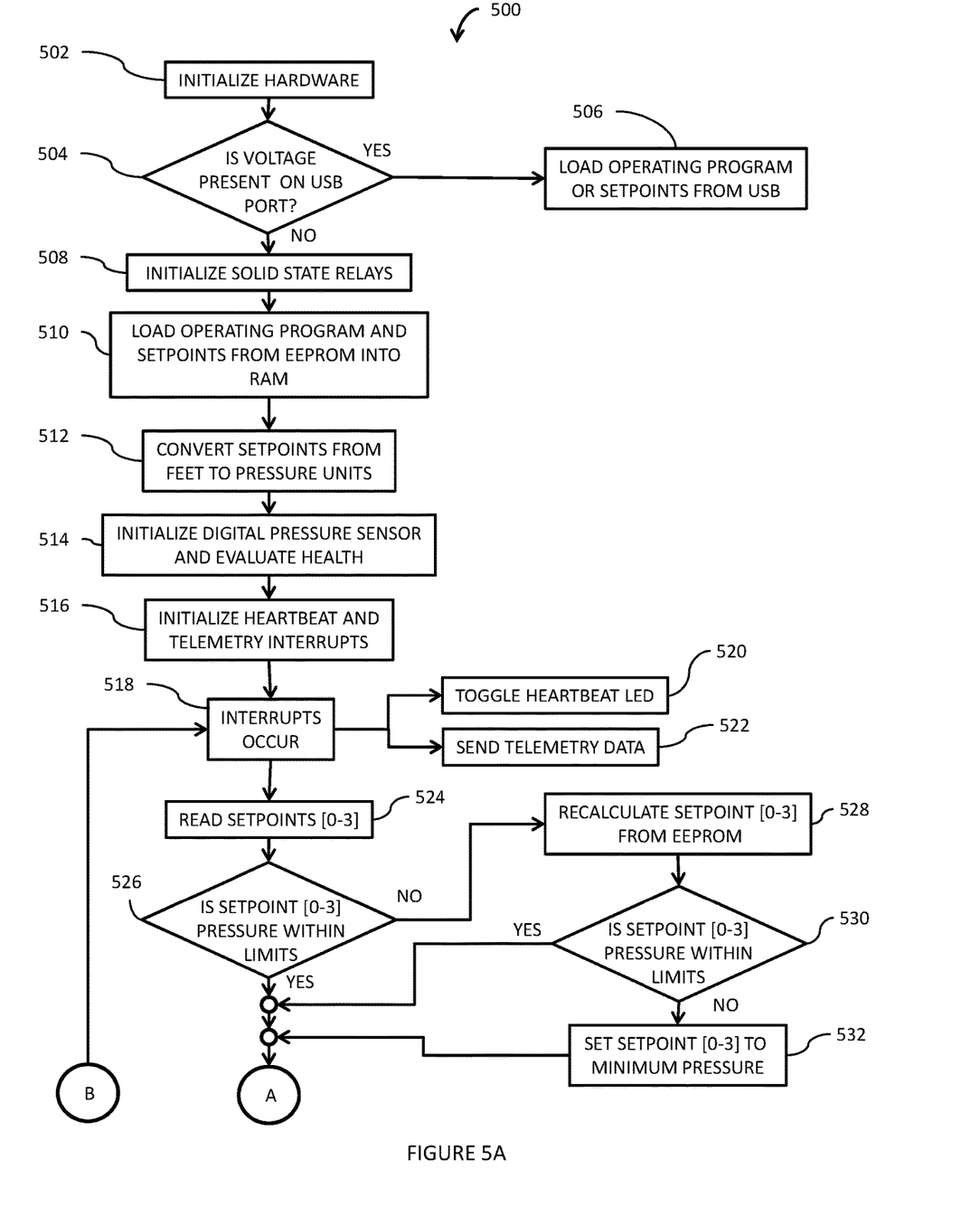
FIGS. 5A and 5B show a flow chart of the operations of the microcontroller controlled altimeter according to the disclosed embodiments.
Figure 5B:
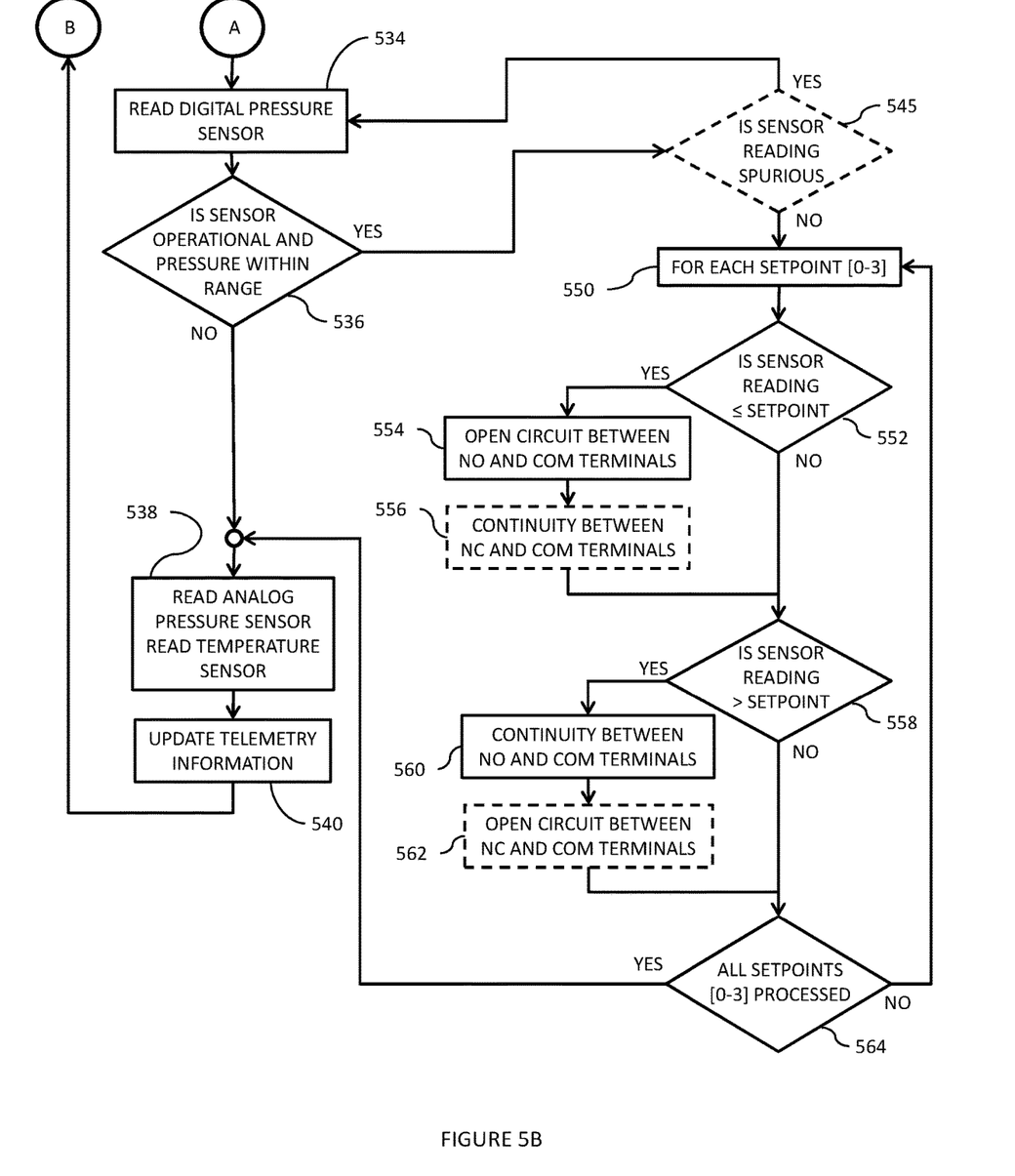

FIGS. 5A and 5B show a flow chart 500 illustrating exemplary operations of the microcontroller controlled altimeter 100 according to the disclosed embodiments. In block 502, upon startup, the computer readable program code in the microcontroller memory 112 operates to perform a hardware initialization. In bock 504, a test is performed to determine if a voltage is present on the system programming port 145, implemented as a USB port. If there is a voltage present, an operating program, the altitude setpoints, or both, may be loaded through the USB port as shown in block 506, otherwise, set up operations may begin with an initialization of the solid state relays as shown in block 508. In block 510, the operating program and setpoints may be loaded into RAM 510, and in block 512, the setpoints, entered into EEPROM in units of feet above sea level, may be converted from feet to pressure units. The digital altitude pressure sensor 115 may be initialized and evaluated for functionality in block 514, and heartbeat and telemetry interrupts may be initialized in block 516.

When the heartbeat interrupt occurs as shown in block 518, the heartbeat LED may be toggled, as shown in block 520. When the telemetry interrupt occurs as shown in block 518, telemetry data may be sent out through the communications port 135 as shown in block 522. The time between telemetry interrupts may be programmable, for example, through the system programming port 145. The telemetry data may include, for example, one or more of a telemetry packet number, state of the breakwire, the microcontroller output for each of the solid state switches, the setpoints in feet, the setpoints converted to pressure, the last digital altitude pressure sensor reading, an analog altitude sensor reading, the current temperature, firmware version, and firmware checksum.

In block 524 the altitude setpoints [0-3] for solid state relays 120A, 120B, 120C, and 120D, respectively, are read, and in block 526 they are compared to the measurement capabilities of the digital altitude pressure sensor 115. If the altitude setpoints [0-3] are within the measurement capabilities of the digital altitude pressure sensor 115, the operations proceed to block 534. Otherwise, the one or more setpoints that are outside the measurement capabilities of the digital altitude pressure sensor 115 are read from EEPROM and recalculated from feet above sea level values to pressure values, in block 528, and the recalculated values are compared to the measurement capabilities of the digital altitude pressure sensor 115, as shown in block 530. If the one or more recalculated values are within the measurement capabilities of the digital altitude pressure sensor 115, the one or more recalculated values are used for subsequent operations. If any of the recalculated values are not within the measurement capabilities of the digital altitude pressure sensor 115, each recalculated value outside the measurement capabilities of the digital altitude pressure sensor 115 is set to a minimum pressure value, as shown in block 532.

After checking the values of the altitude setpoints [0-3], the system proceeds to a main procedure illustrated in FIG. 5B, where, as shown in block 534, the digital altitude pressure sensor 115 is read. If the pressure output is outside of the range of the digital altitude pressure sensor 115, the system reads the analog altitude sensor 160 and the temperature sensor 130, as shown in block 538, updates the telemetry data, as shown in block 540, and sends the telemetry data at the next telemetry interrupt, as shown in block 518. If the digital altitude pressure sensor 115 is operational and if the pressure output is within the range of the digital altitude pressure sensor 115, the system may optionally check for spurious readings, for example, readings that do not correspond with an expected trajectory, in block 545. As a further example, if the digital altitude pressure sensor readings follow a trend such as a descent, a reading midway through the trajectory that indicates an ascent, or a reading indicating an descent that is physically impossible, may be considered spurious. In that case, the system may disregard the reading and again read the digital altitude pressure sensor 115 as shown in block 534. If the digital altitude pressure sensor reading is not spurious, the system may then proceed to compare the output of the digital altitude pressure sensor 115 to the setpoints [0-3], for the solid state relays 120A, 120B, 120C, 120D, respectively, as shown in block 550.

In block 552, if the digital altitude pressure sensor output is less than, or equal to, the setpoint for the particular solid state relay, the microcontroller 110 provides a signal that causes an open circuit between the normally open (NO) and common (COM) terminals of the solid state relay corresponding to the setpoint, if the relay is a FORM A relay, as shown in block 554. If the solid state relay corresponding to the setpoint is a FORM C relay, in addition to the signal that causes an open circuit between the normally open (NO) and common (COM terminals, the microcontroller 110 also provides a signal that provides continuity between the normally closed (NC) and common (COM) terminals of the corresponding solid state relay, as shown in block 556.

In block 558, if the digital altitude pressure sensor output is greater than the setpoint for the particular solid state relay, the microcontroller 110 provides a signal that provides continuity between the normally open (NO) and common (COM) terminals of the solid state relay corresponding to the setpoint, if the relay is a FORM A relay, as shown in block 560. If the solid state relay corresponding to the setpoint is a FORM C relay, in addition to the signal that provides continuity between the normally open (NO) and common (COM terminals, the microcontroller 110 also provides a signal that causes an open circuit between the normally closed (NC) and common (COM) terminals of the corresponding solid state relay, as shown in block 562.

In block 564, a test is performed to determine if all the setpoints [0-3] have been processed, and if not, the process returns to block 550 for the next setpoint. Otherwise, the system reads the analog altitude sensor 160 and the temperature sensor 130, as shown in block 538, updates the telemetry data, as shown in block 540, and sends the telemetry data at the next telemetry interrupt, as shown in block 518.

The disclosed microcontroller controlled altimeter 100 overcomes prior limitations by combining the robust and cost effective nature of contemporary solid state technology to deliver a system that is smaller than current systems while still maintaining the same switch channel density but also providing auxiliary user outputs. The microcontroller controlled altimeter 100 combines a high accuracy integrated silicon based pressure sensor with MOSFET technology to provide traditional normally open and normally closed switches in a solid state relay format, capable of high power switching for applications such as pyrotechnics. Additionally, the output of the sensor and switches are provided to the user for real time altitude determination as well as discrete altitude setpoint knowledge. Updates to the altitude setpoints are facilitated through USB programming to allow for in-field adjustment and to provide added flexibility late during integration and test.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

The invention claimed is:

1. A microcontroller controlled altimeter comprising:
   a microcontroller;
   a digital altitude pressure sensor with a pressure indicating output coupled to the microprocessor; and
   at least one Form A solid state relay coupled to the microcontroller,
   wherein the microcontroller is configured to provide control signals to the at least one Form A solid state relay to:
      provide an open circuit between normally open and common terminals of the at least one Form A solid state relay if the digital altitude pressure sensor output is less than, or equal to, a setpoint for the at least one Form A relay; and
      provide continuity between the normally open and common terminals of the at least one Form A solid state relay if the digital altitude pressure sensor output is greater than the setpoint for the at least one Form A relay.

2. The microcontroller controlled altimeter of claim 1, wherein the at least one Form A solid state relay comprises an isolating driver coupled to the control signals to the at least one Form A solid state relay, driving a pair of FETs connected back to back.

3. The microcontroller controlled altimeter of claim 1, further comprising:
   at least one Form C solid state relay coupled to the microcontroller,
   wherein the microcontroller is configured to provide control signals to the at least one Form C solid state relay to:
      provide an open circuit between normally open and common terminals of the at least one Form C solid state relay if the digital altitude pressure sensor output is less than, or equal to, a setpoint for the at least one Form C relay;
      provide continuity between the normally open and common terminals of the at least one Form C solid state relay if the digital altitude pressure sensor output is greater than the setpoint for the at least one Form C relay;
      provide continuity between normally closed and common terminals of the t least one Form C solid state relay if the digital altitude pressure sensor output is less than, or equal to, the setpoint for the at least one Form C relay; and
      provide an open circuit between the normally closed and common terminals of the at least one Form C solid state relay if the digital altitude pressure sensor output is greater than the setpoint for the at least one Form C relay.

4. The microcontroller controlled altimeter of claim 3, wherein the at least one Form C solid state relay comprises a pair of isolating drivers coupled to the control signals to the at least one Form C solid state relay, each driving a pair of FETs connected back to back, wherein the pairs of FETs are connected in series.

5. The microcontroller controlled altimeter of claim 3, further comprising:
   a hardware lockout circuit through which the control signals from the microcontroller to the at least one Form A solid state relay and from the microcontroller to the at least one Form C solid state relay are coupled; and
   a breakwire conductor that when grounded, enables the hardware lockout circuit and disconnects the control signals from the microcontroller to the at least one Form A solid state relay and to the at least one Form C solid state relay.

6. The microcontroller controlled altimeter of claim 5, further comprising a communications port, wherein the microcontroller is further configured to:

collect telemetry data comprising one or more of a telemetry packet number, a state of the breakwire conductor, the microcontroller control signals to each of the at least one Form A solid state relay and to the at least one Form C solid state relay, an output of each of the at least one Form A solid state relay and the at least one Form C solid state relay, the setpoints for the at least one Form A and the at least one Form C relays in feet, the setpoints for the at least one Form A and the at least one Form C relays converted to pressure, an output of the digital altitude pressure sensor; a current temperature, and a firmware version and checksum of the microcontroller; and communicate the telemetry data through the telecommunications port.

7. The microcontroller controlled altimeter of claim 1, further comprising a system programming port configured to load the at least one setpoint into a memory of the microcontroller.

8. The microcontroller controlled altimeter of claim 7, wherein the system programming port is configured to load systems programs into the memory of the microcontroller.

9. A method of operating a microcontroller controlled altimeter comprising a microprocessor, a digital altitude pressure sensor with a pressure indicating output coupled to the microprocessor, and at least one Form A solid state relay coupled to the microprocessor, the method comprising:

operating the microcontroller to provide control signals to the at least one Form A solid state relay to:

provide an open circuit between normally open and common terminals of the at least one Form A solid state relay if the digital altitude pressure sensor output is less than, or equal to, a setpoint for the at least one Form A relay; and provide continuity between the normally open and common terminals of the at least one Form A solid state relay if the digital altitude pressure sensor output is greater than the setpoint for the at least one Form A relay.

10. The method of operating a microcontroller controlled altimeter of claim 9, comprising constructing the at least one Form A solid state relay using an isolating driver coupled to the control signals to the at least one Form A solid state relay, driving a pair of FETs connected back to back.

11. The method of operating a microcontroller controlled altimeter of claim 9, wherein the microcontroller controlled altimeter further comprises at least one Form C solid state relay coupled to the microcontroller, the method further comprising:

operating the microcontroller to:

provide an open circuit between normally open and common terminals of the at least one Form C solid state relay if the digital altitude pressure sensor output is less than, or equal to, a setpoint for the at least one Form C relay;

provide continuity between the normally open and common terminals of the at least one Form C solid state relay if the digital altitude pressure sensor output is greater than the setpoint for the at least one Form C relay;

provide continuity between normally closed and common terminals of the t least one Form C solid state relay if the digital altitude pressure sensor output is less than, or equal to, the setpoint for the at least one Form C relay; and provide an open circuit between the normally closed and common terminals of the at least one Form C solid state relay if the digital altitude pressure sensor output is greater than the setpoint for the at least one Form C relay.

12. The method of operating a microcontroller controlled altimeter of claim 11, comprising constructing the at least one Form C solid state relay using a pair of isolating drivers coupled to the control signals to the at least one Form C solid state relay, each isolating driver driving a pair of FETs connected back to back, wherein the pairs of FETs are connected in series.

13. The method of operating a microcontroller controlled altimeter of claim 11, comprising using a hardware lockout circuit to disconnect the control signals from the microcontroller to the at least one Form A solid state relay and to the at least one Form C solid state relay, when a breakwire conductor of the hardware lockout circuit is grounded.

14. The method of operating a microcontroller controlled altimeter of claim 13, comprising:

collecting telemetry data comprising one or more of a telemetry packet number, a state of the breakwire conductor, the microcontroller control signals to each of the at least one Form A solid state relay and to the at least one Form C solid state relay, an output of each of the at least one Form A solid state relay and the at least one Form C solid state relay, the setpoints for the at least one Form A and the at least one Form C relays in feet, the setpoints for the at least one Form A and the at least one Form C relays converted to pressure, an output of the digital altitude pressure sensor; a current temperature, and a firmware version and checksum of the microcontroller; and communicating the telemetry data through a telecommunications port of the microcontroller controlled altimeter.

15. The method of operating a microcontroller controlled altimeter of claim 9, comprising loading the at least one setpoint into a memory of the microcontroller using a system programming port.

16. The method of operating a microcontroller controlled altimeter of claim 15, comprising using the system programming port to load systems programs into the memory of the microcontroller.

* * * * *